United States Patent [19]
Groves et al.

[11] Patent Number: 4,934,656
[45] Date of Patent: Jun. 19, 1990

[54] HIGH-PRESSURE BALL VALVE

[75] Inventors: Oliver J. Groves, Seattle; Marvin D. Dansie, Federal Way, both of Wash.

[73] Assignee: The Boeing Company, Seattle, Wash.

[21] Appl. No.: 363,093

[22] Filed: Jun. 8, 1989

[51] Int. Cl.$^5$ .............................................. F16K 5/06
[52] U.S. Cl. .................................... 251/315; 251/317; 277/102; 277/125
[58] Field of Search ............... 251/172, 314, 315, 316, 251/317, 361; 277/102, 123, 124, 125

[56] References Cited

U.S. PATENT DOCUMENTS

| | | |
|---|---|---|
| Re. 26,133 | 1/1967 | Wright . |
| 620,320 | 2/1899 | Hoey . |
| 2,307,828 | 1/1943 | Eggleston . |
| 2,437,180 | 3/1948 | Allen . |
| 2,757,355 | 7/1956 | Howes et al. . |
| 2,772,900 | 12/1956 | Campbell . |
| 3,077,902 | 2/1963 | Vechery .................. 251/315 X |
| 3,598,363 | 8/1971 | Shaw ...................... 251/315 X |
| 3,606,356 | 9/1971 | Beroset . |
| 3,673,547 | 6/1972 | Ziegler, Jr. . |
| 4,192,519 | 3/1980 | Buggele ................... 277/125 X |
| 4,286,139 | 8/1981 | Taylor . |
| 4,327,895 | 5/1982 | Blumenkranz et al. . |

FOREIGN PATENT DOCUMENTS

| | | |
|---|---|---|
| 645243 | 4/1964 | Belgium . |
| 356507 | 10/1931 | United Kingdom . |
| 618236 | 4/1949 | United Kingdom . |

Primary Examiner—John Fox
Attorney, Agent, or Firm—Seed and Berry

[57] ABSTRACT

A ball valve capable of sealing fluids under high pressure is disclosed. The ball valve includes a valve body having a first internal shoulder and a second internal shoulder. A support ring abuts against the first internal shoulder. A sealing ring having an annular recess extending radially abuts against the support ring. A comb disk spring is positioned within the annular recess, the comb disk spring having an apex biased towards the ball. A fitting having a smooth annular support surface extends into the valve body. Sealing rings, such as a backup ring and an O-ring are placed over the smooth support surface and abut against the shoulder of the fitting. A compression ring is placed over the end of the fitting, abutting against the sealing rings. When the fitting is placed within the valve body, the compression ring abuts against the second shoulder of the valve body. Threading of the fitting 20 into the valve body causes the sealing rings to be compressed between the compression ring and the shoulder of the fitting. An arcuate surface on the compression ring forces the O-ring against as support surface of the fitting and a sealing surface of the valve body, preloading the ball valve assembly in the sealed condition. When the ball valve is closed, a seal between the ball and the flow passage is provided by the fitting firmly retaining the comb disk spring and the sealing ring against the ball. Sealing on the side in which the fluid exists is provided between the valve body and the fitting by the combination of the compression ring, O-ring and backup rings and their relationship to the fitting and the valve body.

14 Claims, 4 Drawing Sheets

HIGH-PRESSURE BALL VALVE

STATEMENT OF GOVERNMENT RIGHTS

The Government has certain rights in this invention.

TECHNICAL FIELD

This invention relates generally to ball valves and, more particularly, to a ball valve capable of withstanding high pressures.

BACKGROUND OF THE INVENTION

Conventional ball valves generally include a tubular valve body, a rotatable ball disposed within the center of the valve body and annular seals positioned on each side of the ball. A flow passage through the ball allows the passage of fluid when the ball is rotated into the open position. Rotating the ball to the closed position prevents fluid from passing through the ball valve.

To prevent leakage of the ball valve under high pressures, various gaskets, seal carriers or union nuts may be utilized. For example, as illustrated in U.S. Pat. No. 4,327,895, to Blumenkranz et al., a union nut is threadably attached to the valve body to retain a movable seal carrier within the ball valve housing. Annular grooves are provided within the seal carrier having an O-ring therein to prevent leakage of fluid under pressure. A disadvantage of placing the O-rings in an annular groove is that fluid may leak past the O-ring if the pressure becomes too high. Having the O-rings within a groove also requires that the O-rings be stretched over a larger diameter than the groove for placement in the groove. The O-ring may be overstretched or damaged while placing it within the groove, causing the valve to leak and requiring complete disassembly and replacement of the O-ring.

SUMMARY OF THE INVENTION

A ball valve of the invention includes a valve body having a fitting threadably coupled thereto. A rotatable ball having an axial flow passage is disposed within the valve body. The internal surface of the valve body includes a first circumferential shoulder and a second circumferential shoulder. A support ring is positioned within the valve body, abutting against the first shoulder. A sealing ring abuts against the ball and is adjacent the support ring, the sealing ring forming a seal around one side of the ball when the ball is rotated to the closed position and being held by the support ring. The sealing ring includes an annular recess extending radially. A comb disk spring is positioned within the annular recess of the sealing ring. The comb disk spring has its apex along the inner radius and a base at the outer radius. The apex is closer to the ball than the base is to the ball. A compression ring having a first flat surface and an arcuate surface opposite the first flat surface is positioned within the valve body, abutting against the second shoulder.

The fitting threadably coupled to the valve body extends into the valve body. The fitting includes an annular support surface extending through the compression ring. An O-ring and a backup ring extend circumferentially around the support surface of the fitting, adjacent the compression ring. The backup ring abuts a shoulder of the fitting, the O-ring and backup ring being held between the compression ring and the shoulder. The fitting is threaded into the valve body until the O-ring abuts against the arcuate surface of the compression ring. The compression ring is held firmly in position by abutting against the second shoulder of the valve body. Further threading of the fitting presses the O-ring against the compression ring, causing the O-ring to deform. The arcuate surface of the compression ring causes deforming of the O-ring outward from its center toward both the support surface of the fitting and the sealing surface of the valve body. A fluid-tight seal is thus created between the fitting and the valve body.

When the valve is closed and high-pressure fluid is being held by the ball valve, a fluid seal is maintained both between the ball and the tubing and between the valve body and the fitting. The sealing ring, comb disk spring and end of the fitting cooperate to prevent fluid leakage between the ball and the tubing. The second shoulder of the valve body, compression ring, O-ring, backup ring, valve body sealing surface and fitting cooperate to prevent fluid leakage between the fitting and valve body.

DETAILED DESCRIPTION OF THE INVENTION

Figure 1:
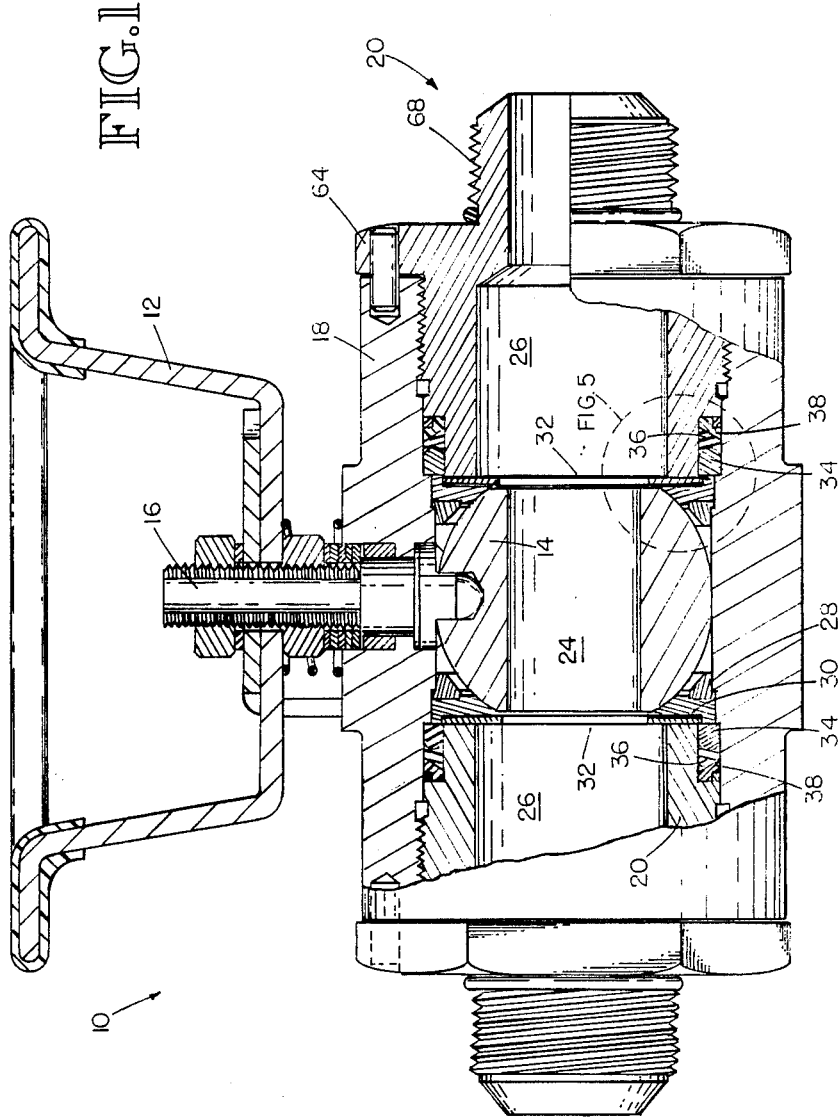
FIG. 1 is a partial cross-sectional view of a ball valve according to the invention.
Figure 2:
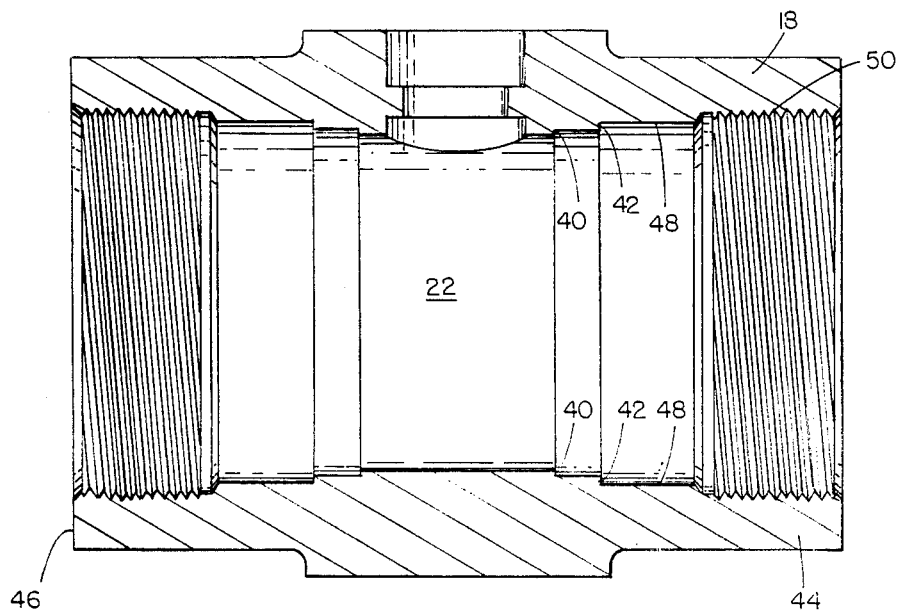
FIG. 2 is a cross-sectional view of the valve body.

As shown in FIGS. 1 and 2, the ball valve 10 includes a handle 12, a ball 14, a valve body 18 and a fitting 20. The ball valve assembly 10 also includes a support ring 28, a sealing ring 30, a comb disk spring 32, a compression ring 34, and O-ring 36, and a backup ring 38.

The valve body 18 includes an internal axially extending chamber 22 having the ball 14 and the fitting 20 within the chamber 22. The ball 14 has an axially extending flow passage 24 which as illustrated in FIG. 1, is aligned with an axially extending flow passage 26 in the fitting 20. The ball is selectively rotatable to open or close the flow passage through the fitting 26 to permit or prevent passage of fluid through the ball valve 10. Tubing (not shown) is connectable at both ends of the fitting 20 by coupling to threads 68, the ball valve controlling the flow of fluid in the tubing. Any appropriate prior art handle 12, connecting shaft 16 and ball 14, is suitable for use in the inventive ball valve 10 of the invention, the operation of these parts being known in the art. A suitable handle, connecting shaft and ball assembly is presently being sold by Whitey Corporation, though other assemblies are also suitable.

As shown in FIG. 2, the valve body 18 has a first end 44 and a second end 46. A first shoulder 40 and second shoulder 42 extend annularly in the chamber 22. The second shoulder 42 is positioned closer to the first end 44 than the first shoulder 40 is to the first end 44. The valve body 18 includes a sealing surface 48 extending from the second shoulder 42 toward the first end 44. Internal threads 50 are positioned adjacent to the first end 44 for holding the fitting 20 within the valve body 18. The second end 46 may be constructed in similar fashion to the first end 44 to provide similar sealing characteristics on both sides of the ball 14. Conversely, the second end 46 may be constructed differently, if desired, with the side near end 44 providing a first type of ball valve sealing and the side near end 46 providing a different type of sealing.

Figure 3:
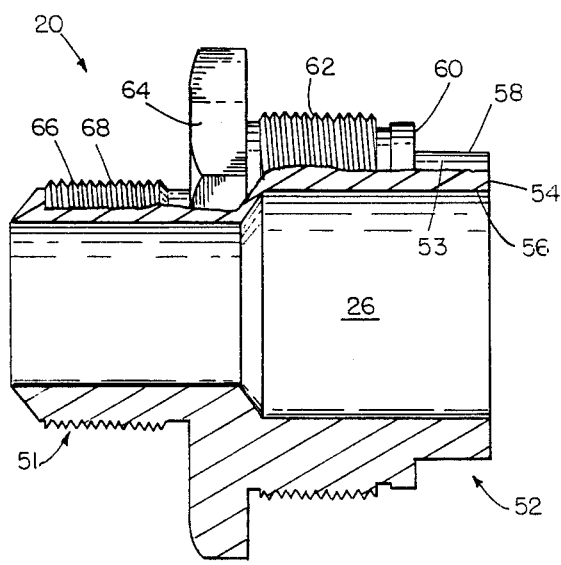
FIG. 3 is a partial cross-sectional view cutaway of the fitting.

As shown in FIG. 3, the fitting 20 has a first end 52 for extending into the valve body and a second end 51, the second end remaining outside the valve body 18. The end 52 includes an extending portion 53 having an annular smooth support surface 58 and a smooth inner surface 56. The extending member 53 includes a flat end surface 54 extending radially from the inner surface 56 to the support surface 58.

The end 52 includes a shoulder 60 adjacent the support surface 58 having a larger outside diameter than the extending portion 53. External threads 62 mate with the internal threads 50 of the valve body 18. The fitting 20 includes an integral nut 64 for tightening to a selected torque. Additional threads 66 or a connecting nut may be provided to permit connection to an external pipe assembly in any convenient manner, as is well known in the prior art.

Figure 4:
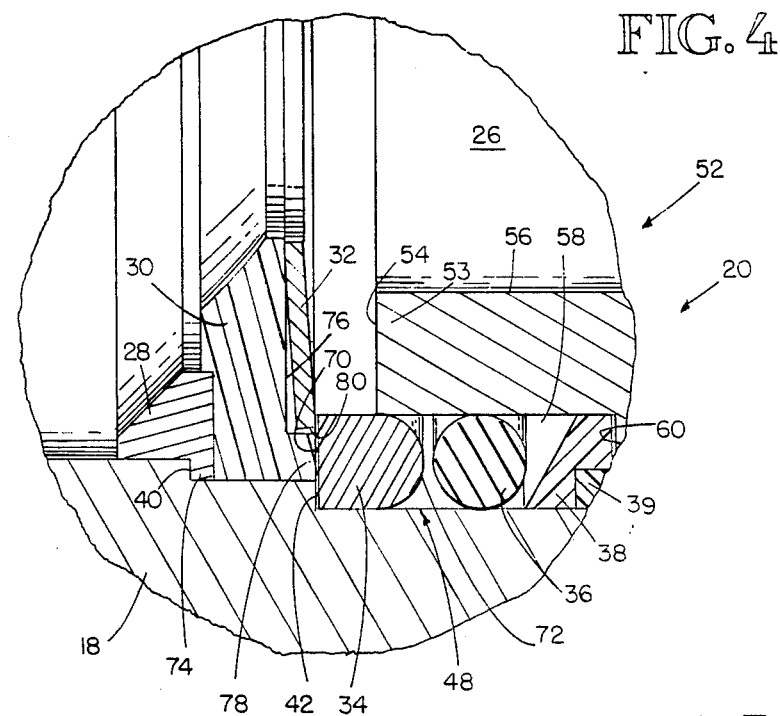
FIG. 4 is an enlarged view of the section as indicated in FIG. 1 of the sealing ring, compression ring and O-ring prior to being preloaded.

As shown in FIG. 4, support ring 28, sealing ting 30 and comb disk spring 32 is positioned within the valve body prior to threading the fitting 20 into the valve body 18. The support ring 28 includes a flange 74 abutting against shoulder 40, the flange 74 having a larger outside diameter than the diameter of the shoulder 40 and approximately equal to the diameter of the shoulder 42. The support ring 28 does not contact the ball 14. Sealing ring 30 abuts against support ring 28 and against the ball 14. The seal between ball 14 and the passageway 26 is formed between the ball 14 and the sealing ring 30. The sealing ring 30 includes an annular recess 76 and an annular shoulder portion 78. The annular recess 76 extends radially from an inside diameter to an outside diameter of the sealing ring 30. Comb disk spring 32 is placed within the annular recess 76 and is held in position by shoulder 78.

Figure 5:
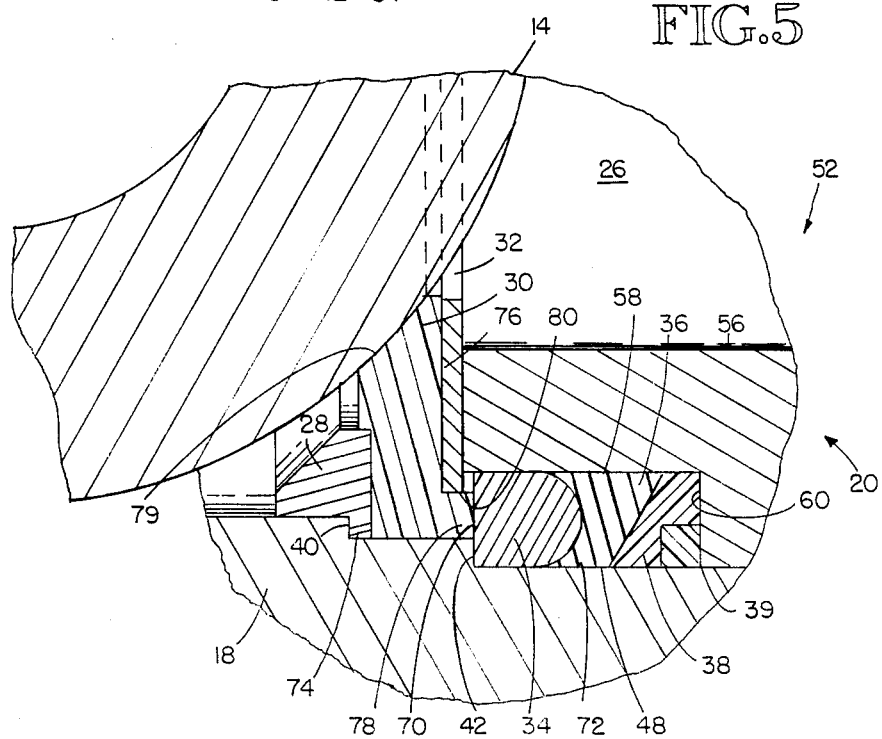
FIG. 5 is a view of the same elements as FIG. 4 in the loaded condition under fluid pressure.
Figure 6:
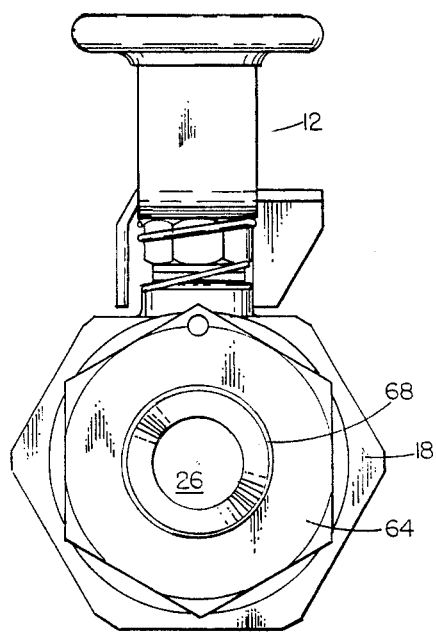
FIG. 6 is an end view of the fitting ball valve of FIG. 1.

The comb disk spring 32 is formed and positioned to be resiliently biased inward as shown in FIG. 4, the comb disk spring being similar in shape to a standard washer except that it is formed with a spring bias causing the inside radius to have an apex facing inward from the outside radius at the base 80. The apex of the comb disk spring 32 rests against the sealing ring 30 while the outside radius 80 is biased slightly above the surface of the recess 76 and slightly spaced from shoulder portion 78 in the preloaded condition. The space between the outside surface 80 of comb disk spring 32 and the shoulder 78 of sealing ring 30 is relatively small, just large enough to permit the comb disk spring 32 to extend flush against the shoulder 78 when the comb disk spring 32 is in the compressed, loaded condition and held flat, as best shown in FIG. 5.

In the preferred embodiment, the shoulder 78 of the seal 30 approximately aligns with the shoulder 42. The shoulder 78 may be slightly recessed from the shoulder 42 to ensure that the compression ring 34 abuts against and is held by shoulder 42 rather than by the seal 30 and support ring 28. The shoulder 78 has a radial width less than the surface 70 of compression ring 32 to ensure that the comb disk spring 32 is adjacent the compression ring 34. The inside diameter of the compression ring 34 is smaller than the outside diameter 80 of the comb disk spring 32 to permit the spring to contact and be held by the compression ring 34 when the base 80 is biased outward, as shown in FIG. 4. In an alternative embodiment, the shoulder 78 is not provided and the comb disk extends to the shoulder 42, across the portion of surface 70 extending above the shoulder 42.

FIG. 4 is an enlarged view taken from FIG. 1 of the sealing assembly prior to being preloaded. Backup rings 39 and 38 are placed over the end 52 of fitting 20 and slid along support surface 58 until they abut against shoulder 60. O-ring 36 is then placed over the end 52 of fitting 20 and slid along surface 58 until it abuts against backup ring 38. Two backup rings 38 and 39 are used in the preferred embodiment. However, if desired, only a single backup ring 38 or no backup ring may be used. Backup ring 39 is harder than backup ring 38. Backup ring 38 is harder than O-ring 36. Any appropriate combination of backup rings and O-rings for providing sealing between the support surface 58 and the sealing surface 48 is suitable. The individual O-ring 36, backup ring 38 and backup ring 39, as used in the preferred embodiment of the invention, are commercially available prior art rings sold by Shambam Corporation.

In the prior art, the O-ring 36 was placed in a groove formed in a member within a prior art valve body. See, for example, U.S. Pat. No. 4,327,895 to Blumenkranz. The O-ring had to be stretched over an extending flange or end of the member and pushed forward for placement in the groove. Backup rings, if used, were also placed in a groove with the O-ring. Because the backup rings are not sufficiently elastic to be stretched over an end of a fitting and then spring back into a groove, the backup rings of the prior art were scarf cut to permit them to be placed in the groove. According to this invention, the O-ring and backup rings are placed over the end of the fitting 20 and slid until they abut against shoulder 60. As can be seen from viewing FIG. 3, the extending portion 53 includes a smooth annular surface 58 for the O-ring support, having no grooves and a constant outside diameter from the end face 54 to shoulder 60. The O-ring is thus not placed in a groove. Having the backup rings 39 and 38 and O-ring 36 placed over the end of the fitting 20, rather than placed in grooves, significantly reduces the wear and tear on the rings while in use and when assembling and disassembling the ball valve.

As shown in FIG. 4, compression ring 34 extends over the end 54 of the fitting 20 after the O-ring 36 and backup rings 38 and 39 are in place. Compression ring 34 is a metal ring of a high quality titanium or steel alloy. Compression ring 34 includes a flat surface 70 extending radially from the inside radius to the outside radius and an arcuate surface 72 opposite the flat surface 70. The arcuate surface 72 abuts against the O-ring 36, as best shown in FIGS. 4 and 5. The width of the flat surface 70 is approximately equal to the radial width of the O-ring 36. When placed within the valve body 18, the compression ring 34 abuts against shoulder 42, the outside diameter of the O-ring 36 being approximately equal to the inside diameter of sealing surface 48 and less than the diameter of shoulder 42. FIG. 4 illustrates the relationship of the parts prior to being preloaded and the fitting 20 not tightly threaded into the valve body 18.

Prior to use as a ball valve, the O-ring is preloaded by threading the fitting 20 into the valve body 18 and tightening it to a predetermined torque as shown in FIG. 1. FIG. 5 is an enlarged view of the sealing assembly in the loaded condition, under fluid pressure. Threading the fitting 20 into the valve body 18 causes the flange 53 and shoulder 60 to advance forward into the valve body. The compression ring 34, abutting against shoulder 42, is held stationary relative to the valve body. The O-ring 36 and backup rings 38 and 39 are pressed against the compression ring 34 as the fitting 20 is threaded into the valve body 18. The arcuate surface 72 causes the O-ring 36 to deform and extend outward in both directions to firmly abut against the support surface 58 and sealing surface 48. Further loading of the O-ring 36 by threading fitting 20 increases the force with which the O-ring 36 is pressed against the sealing surface 48 and support surface 58. The fitting 20 is tightened to a predetermined torque. The torque valve selected for the predetermined torque is the amount required to ensure that the O-ring 36 is significantly deformed, being firmly pressed against sealing surface 48 and support surface 58 by compression ring 34 and backup rings 38 and 39. The O-ring 36 may be preloaded with sufficient force that it substantially becomes fluid to ensure a tight and complete seal between the fitting 20 and the valve body 18. The fitting 20 is threaded sufficiently far into the valve body 18 that the flat end 54 is approximately aligned with the flat surface 70 of the compression ring 34 and shoulder 42. When preloaded, the flat end 54 may even extend slightly beyond the flat surface 70, inward from the end of the valve body.

The flat surface 70 of compression ring 34 is selected to be sufficiently wide that it extends completely across the shoulder portion 78 and overlaps comb disk spring 32. In the preloaded condition, with the ball valve 10 completely assembled and ready for use, the comb disk spring 32 is adjacent the flat surface 70 of the compression ring 34 and adjacent the end 54 of fitting 20. The comb disk spring 32 is not necessarily completely compressed when in the preloaded condition, prior to operation of the ball valve. The comb disk spring presses the seal 30 against the ball 14, providing resilient biasing to hold the seal in position when preloaded without the working load on the ball valve.

The preloading of the seal assembly ensures that the compression ring 34 firmly abuts against the shoulder 42, that the sealing rings 36, 38 and 39 are compressed between compression ring 34 and shoulder 60 and abut against support surface 58 and sealing surface 48. Preloading of the fitting 20 does not place significant load on sealing ring 30 or comb disk spring 32. While the sealing ring 30 may contact the ball 14, the pressure against the ball 14 is not sufficiently high to make rotation of the ball 14 difficult. In the completely assembled, preloaded condition, the handle 12 is easily turnable to rotate the ball 14 to align the flow passage 24 with the flow passage 26 through the ball valve or to close the ball valve. The comb disk springs press the seals 30 on each side of the ball firmly against the ball in the preloaded condition to provide a snug fit but permitting rotation.

FIG. 5 illustrates the closed ball valve in the loaded condition, holding fluid under pressure. The fluid under pressure is illustrated as being on the opposite side of the ball than that shown. The fluid under pressure forces the ball 14 tightly against sealing ring 30. The ball 14 may be slightly physically displaced within the valve body 18 and pushed toward the sealing ring 30 if the fluid is of extremely high pressure, for example between 5,000 and 12,000 psi. Fluid pressure on ball 14 causing the ball to press against sealing ring 30 presses sealing ring 30 against comb disk spring 32 and presses the entire assembly against end 54 of fitting 20. The comb disk spring 32 is compressed, becoming flattened against end surfaces 54 of fitting 20. Fitting 20 is held firmly in position by the mating of threads 62 and 50. Having the end 54 substantially aligned with or slightly ahead of the flat surface 70 of the compression ring 34 ensures that the main force for retaining the comb disk spring 32 in position is provided by end 54 rather than compression ring 34. A tight seal is thus formed along surface 79 between the sealing ring 30 and the ball 14 preventing fluid from leaking around the ball 14 and into the flow passage 26.

On the opposite side of the ball valve from that shown in FIG. 5, fluid surrounds the ball 14 and fluid is present in flow passage 26. Leakage between the fitting 20 and the valve body 18 must be prevented. The sealing on fluid side of the ball, though not shown, can be understood from viewing FIG. 5. Fluid in passageway 26, being under extremely high pressure, pushes ball 14 away from the sealing ring 30 and toward the opposite end of the valve body. Support ring 28 prevents sealing ring 30 from advancing further in the valve body under the fluid pressure. The comb disk spring 32 is biased outward, in the extend position, pressing against the sealing ring 30 and end 54 to hold the sealing ring in position. Fluid will likely flow between the comb disk spring 30 and the end surface 54 and contact the compression ring 34. The fluid exerts a high pressure directly on compression ring 34, compression ring 34 possibly becoming separated from sealing ring 30 or shoulder 42 due to the pressure of the fluid. Fluid pressure on compression ring 34 causes the ring 34 to be forced toward shoulder 60 with an even greater force than the preload force provided by fitting 20. Placing greater force on compression ring 34 causing arcuate surface 72 to press harder against O-ring 36, forcing O-ring 36 even tighter toward surfaces 48 and 58. The greater the fluid pressure on compression ring 34, the greater the pressure exerted to force the sealing O-ring 36 against sealing surfaces 48 and 58. Leakage between the fitting 20 and the valve body 18 is thus prevented by the seal assembly and compression ring. Preloading of the O-ring by retaining the compression ring 34 rigidly at shoulder 42 and deforming it against surfaces 58 and 48, ensures that a complete seal will be formed prior to the application of fluid pressure and that additional fluid pressure will increase the strength of the seal rather than permit leakage around the O-ring.

While the invention has been shown and described with respect to a preferred embodiment, it will now be understood that substitution of an equivalent structure for any elements within the ball valve assembly falls within the scope of the invention.

We claim:

1. A ball valve capable of withstanding high pressure comprising:

a valve body having threads adjacent a first end, an internal annular sealing surface, a first internal shoulder, a second internal shoulder, said second shoulder being located closer to said first end than said first shoulder;

a ball having an axial flow passage, said ball being disposed within said valve body and spaced from said first and second ends;

a support ring abutting against said first shoulder;

a sealing ring abutting said support ring and said ball;

a comb disk spring positioned adjacent said sealing ring, said comb disk spring having an apex at an inner radius and a base at an outer radius, said apex being closer to said ball than said base is to said ball;

a compression ring having a first flat surface extending radially and an arcuate surface opposite said first flat surface, said compression ring abutting against said second shoulder;

a fitting having threads mating with said threads of said valve body, said fitting having an annular support surface with an outside diameter less than the inside diameter of said compression ring, said compression ring extending around said support surface, said fitting having a shoulder with an outside diameter less than the internal diameter of said internal annular sealing surface; and an O-ring extending circumferentially around said support surface and abutting against said support surface and said valve body sealing surface.

2. The ball valve according to claim 1 wherein said support surface extends axially inward beyond said second shoulder.

3. The ball valve according to claim 1 wherein said disk comb spring abuts against an end of said support surface and said flat surface of said compression ring.

4. The ball valve according to claim 1 wherein said O-ring is preloaded by said compression ring, the accurate surface of said compression ring being in contact with said O-ring and causing said O-ring to deform radially outward and inward.

5. The ball valve according to claim 1 wherein said sealing ring includes an annular recess extending radially and an annular sealing ring shoulder portion extending radially to have a radial width.

6. The ball valve according to claim 5 wherein said first flat surface of said compression ring has a radial width greater than the radial height of said second shoulder and the radial width of said sealing ring shoulder combined.

7. The ball valve according to claim 1, further including a backup ring extending circumferentially around said support surface and abutting against said support surface and said internal annular sealing surface at respective inside and outside surfaces and abutting against said shoulder of said fitting and said O-ring.

8. A ball valve capable of withstanding high pressure comprising:

a valve body means for retaining a ball, said valve body means including internal threads adjacent a first end;

a first shoulder means within said valve body for retaining a support ring;

a second shoulder means within said valve body for retaining a compression ring, said compression ring having a flat, radially extending surface abutting against said second shoulder means and an arcuate surface opposite said flat surface;

a sealing ring means for forming a seal around said ball, said sealing ring means being within said valve body and abutting against said ball;

a spring means abutting against said sealing ring means for biasing said sealing ring means towards said ball;

a fitting means threadably coupled to said valve body for retaining said spring means in said valve body, said fitting means including a flat end surface for retaining said sealing ring means in against said ball;

an annular, smooth support surface means for retaining a sealing ring assembly, said support surface extending through said compression ring, said arcuate surface of said compression ring abutting against said sealing ring assembly; and a third shoulder means for retaining said sealing ring assembly, said third shoulder means abutting against said sealing ring assembly.

9. The valve according to claim 8 wherein said smooth support surface means extends from said fitting.

10. The valve according to claim 9 wherein said third shoulder means extends from said fitting and is adjacent said smooth support surface.

11. The valve according to claim 8 wherein said sealing ring means includes a sealing shoulder for retaining said spring means.

12. The valve according to claim 11 wherein said flat surface of said compression ring has a height higher than the combined height of said second shoulder means and said sealing ring shoulder means.

13. The valve according to claim 11 wherein said spring means being positioned between said sealing ring and said compression ring and contacting said sealing ring and said compression ring.

14. The valve according to claim 13 wherein said spring means is a comb disk spring.

* * * * *